July 31, 1973 E. J. BOLEKY III ET AL 3,749,614

FABRICATION OF SEMICONDUCTOR DEVICES

Filed Sept. 14, 1970 4 Sheets-Sheet 1

INVENTOR.
Edward J. Boleky &
Joseph H. Scott, Jr.
BY M. Y. Epstein
ATTORNEY

INVENTOR.
Edward J. Boleky &
Joseph H. Scott, Jr,
BY M. Y. Epstein
ATTORNEY

July 31, 1973 E. J. BOLEKY III ET AL 3,749,614

FABRICATION OF SEMICONDUCTOR DEVICES

Filed Sept. 14, 1970 4 Sheets-Sheet 3

INVENTOR.
Edward J. Boleky &
Joseph H. Scott, Jr.
BY M. Y. Epstein
ATTORNEY

INVENTOR.
*Edward J. Boleky &*
*Joseph H. Scott, Jr.*
BY M. Y. Epstein
ATTORNEY

United States Patent Office 3,749,614
Patented July 31, 1973

3,749,614

FABRICATION OF SEMICONDUCTOR DEVICES

Edward Joseph Boleky III, Cranbury, and Joseph Hurlong Scott, Jr., Princeton, N.J., assignors to RCA Corporation Filed Sept. 14, 1970, Ser. No. 71,840
Int. Cl. H01l 7/34
U.S. Cl. 148—188 5 Claims

ABSTRACT OF THE DISCLOSURE

Spaced first islands of semiconductor material, from which complementary field effect transistors are to be made, are formed on a substrate. Pedestals, comprising an insulating layer covered by a doped layer of silicon, are provided on each of the islands defining the channel regions of the transistors to be formed. Second islands, formed of doped silicon, are also provided on the substrate, the second islands serving as connectors for the device. A solid-to-solid diffusion source layer is provided on each of the first islands, and the impurities therein are diffused into the first islands to form the source and drain regions of the transistors. In one embodiment, some of the doped layers of the pedestals are further doped during the diffusion step, whereas others of the doped layers are masked from the diffusion source. In another embodiment, all the doped layers are masked from the diffusion source. Prior to the performance of the diffusion step, a thermally grown oxide layer is provided on the second islands.

BACKGROUND OF THE INVENTION

The invention herein disclosed was made in the course of or under a contract or subcontract thereunder with the Department of the Air Force.

This invention relates to the fabrication of semiconductor devices, and especially to the fabrication of integrated circuit devices containing field effect transistors of different type conductivity.

Certain types of integrated circuit devices include a plurality of field effect transistor components each comprising an insulating layer disposed between a gate electrode and a semiconductor channel region, the electrode and channel region being accurately aligned with one-another. In some instances, it is desired that various ones of the components comprise P conductivity channel field effect transistors while other components on the same substrate comprise N conductivity channel field effect transistors. Devices containing such different type conductivity transistors are referred to as "complementary" devices.

A recently suggested method of fabricating such devices comprises forming spaced islands of moderately doped semiconductor material on a substrate, different ones of the islands being of different type conductivity, providing pedestals on portions of the islands, each pedestal comprising a first layer of undoped insulating material covered by a second layer of undoped semiconductor material, covering the islands, including the pedestals thereon, with solid-to-solid diffusion source layers, and simultaneously driving the doping impurities of the diffusion source layers into the various layers covered thereby to form the various source and drain regions of the field effect transistors as well as the gate electrodes thereof.

One disadvantage of this process is that the simultaneous diffusion to form the various regions and gate electrodes restricts the process to the use of certain techniques and materials, some of which, it is found, are not fully satisfactory with respect to the devices being made.

Additionally, in the prior art practice, it is sometimes desired to provide connectors extending between various ones of the islands, the connectors comprising a layer of highly doped semiconductor material covered by a layer of insulating material. It is found that the formation of the insulating layer in accordance with the prior art process, as described hereinafter, tends to adversely affect the components previously formed.

DESCRIPTION OF PREFERRED EMBODIMENTS OF THE INVENTION

Reference is made to U.S. Pat. 3,476,617, issued to P. H. Robinson, on Nov. 4, 1969. This patent describes semiconductor devices of one type with which the instant invention is related, and describes various processes having utility in the practice of the instant invention.

Figure 1:
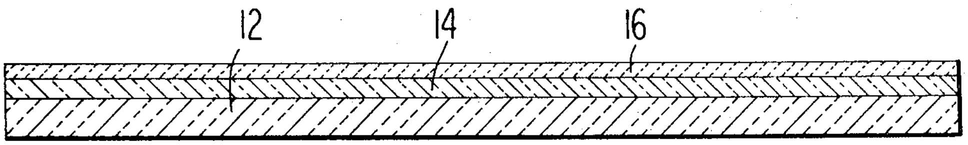
FIGS. 1–6 are cross sectional views of a workpiece processed in accordance with one embodiment of the instant invention, the successive figures showing successive steps in the processing schedule.

The process, according to one embodiment of the instant invention, begins with a workpiece (FIG. 1) comprising a dielectric substrate 12 having thereon a first layer 14 of a semiconductor material covered by a layer 16 of a dielectric material. The semiconductor layer 14 can comprise any one of silicon, germanium, silicon carbide, various III–V compounds, or the like. Silicon is used in the instant embodiment, the layer 14 having a thickness of 1 micron, a resistivity of 1.0 ohm-cm., and being of N type conductivity.

The substrate 12 can comprise any of a number of materials on which the various semiconductor materials can be deposited. Examples of suitable substrate materials are sapphire, spinel, diamond, and silicon carbide. Sapphire is used in the instant embodiment.

The layer 16, as described hereinafter, comprises the gate insulating layer of one of the field effect transistors to be fabricated on the substrate 12, and can comprise silicon dioxide, silicon nitride, aluminum oxide, or the like. With a layer 14 of silicon, the layer 16 preferably comprises silicon dioxide formed by known thermal growth techniques; the layer 16, in this embodiment, having a thickness of 1,000 A. Although a layer 16 of silicon dioxide could also be provided by known deposition techniques, it is found that silicon dioxide layers provided by thermal growth techniques are superior with respect to the performance of the field effect transistors fabricated therewith.

The two layers 16 and 14 are then patterned or defined to provide a rectangular first island 18 (FIGS. 2 and 7) on the substrate 12 using, for example, known photolithographic techniques.

Figure 3:
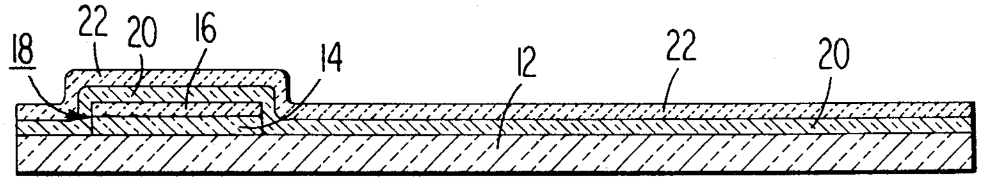

A layer 20 (FIG. 3) of semiconductor material, e.g., 1 ohm-cm. P type conductivity silicon, having a thickness of one micron, is then deposited on the workpiece, and a masking layer 22, of, e.g., thermally grown silicon dioxide is provided on the layer 20. Then, using known photolithographic techniques, the two layers 22 and 20 are defined to provide (FIGS. 4 and 7) a rectangular second island 26 comprising the two layers 20 and 22, and two layers 20 and 22 covering the previously formed first island 18.

Figure 5:
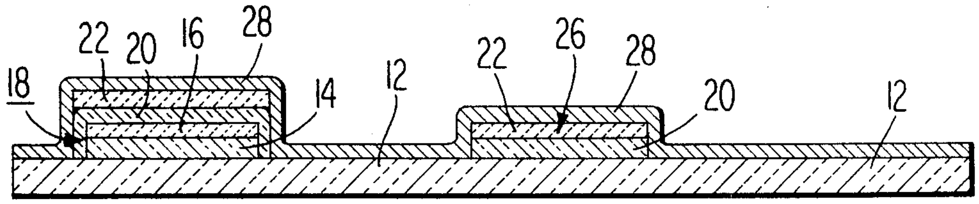
Figure 6:
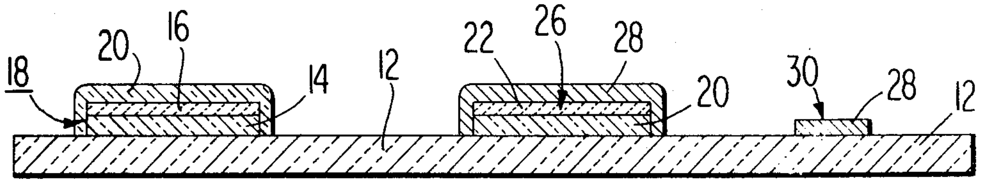
Figure 7:
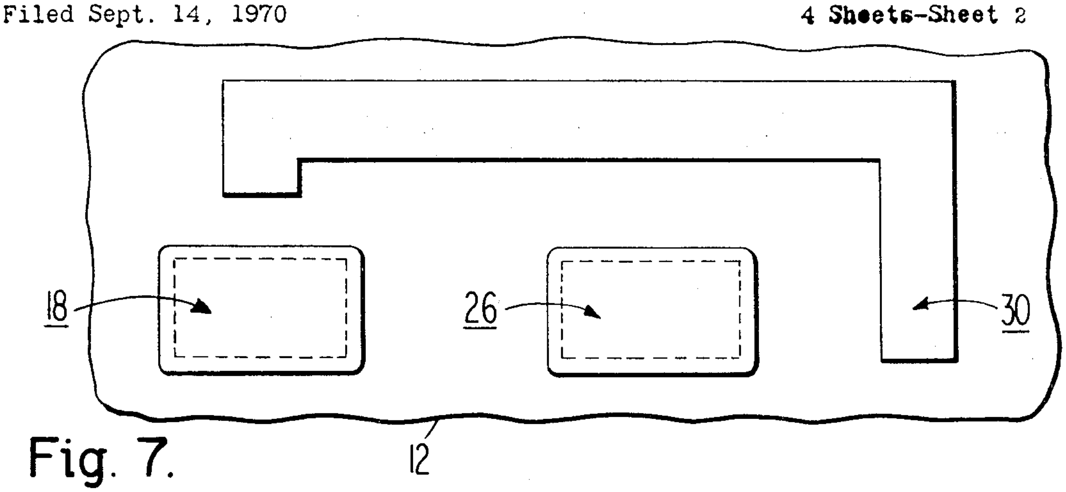
FIG. 7 is a plan view of FIG. 6.

The next step comprises depositing a layer 28 (FIG. 5) of a highly doped semiconductor material, e.g., .001 ohm-cm. N type conductivity silicon having a thickness of 1 micron. This layer is then defined, using known photolithographic processes, to provide, as shown in FIGS. 6 and 7, a third island 30, and a covering layer 28 over the island 26. During the layer 28 defining step, the oxide layer 22 shown in FIG. 5 serves as a masking layer to keep the island 18 thereunder intact. After the layer 28 defining step, the oxide layer 22 is removed (FIG. 6), by, e.g., an etching process.

As described hereinafter, the two islands 18 and 26 are used in the fabrication of field effect transistors, and the third island 30 is used as an electrical connector between various components of the device. While only three islands are shown, in actual practice a large number of islands are formed, the number, size, and shape of the islands being dependent upon the device being fabricated.

Figure 8:
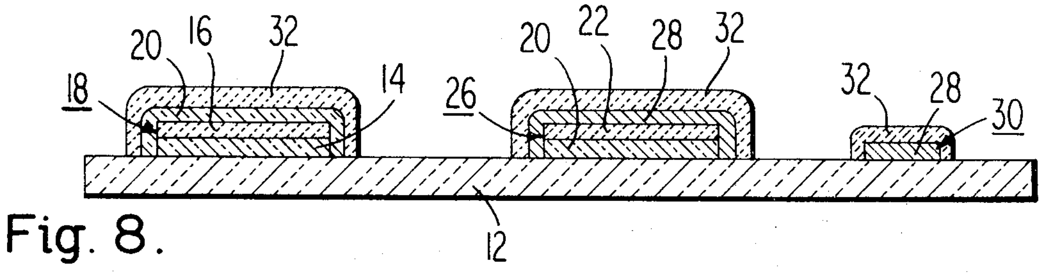
FIGS. 8–12 show still further steps in the processing of the workpiece.

Thereafter, the third island 30 is provided with a layer 32 (FIG. 8) having good electrical insulating characteristics, e.g., silicon dioxide, silicon nitride, or the like. Preferably, the layer 32 is provided by thermal growth techniques for the purpose of providing a relatively dense and chemically pure layer of silicon dioxide, such silicon dioxide layer, as known, being a high quality electrical insulator. The layer 32 has a thickness of 5,000 A. In the process, the silicon layers 20 and 28 of the islands 18 and 26, respectively, are also provided with a silicon dioxide layer 32, as shown.

Of significance, for a reason described hereinafter, is the fact that the thermally grown layer 32 is provided prior to the formation of the source and drain regions of the various transistors eventually fabricated.

Then, using known photolithographic techniques, the three layers 32, 20, and 16 of the island 18 and the three layers 32, 28, and 22 of the island 26 are defined, leaving two pedestals 36 and 38 (FIG. 9) on top of portions of the islands 18 and 26, respectively. The pedestal 36 comprises the layer 20 of P type conductivity silicon sandwiched between the two layers 16 and 32 of silicon dioxide. The pedestal 38 comprises the layer 28 of N type conductivity silicon sandwiched between the two layers 32 and 22 of silicon dioxide. Then, using known photolithographic techniques, the oxide layer 32 of the island 18 pedestal 36 is removed, to allow doping of the layer 20 thereunder, as described below, and an opening 41 (FIG. 9) is made through the layer 32 covering the island 30 to expose a surface portion of the layer 28 thereof.

Figure 10:
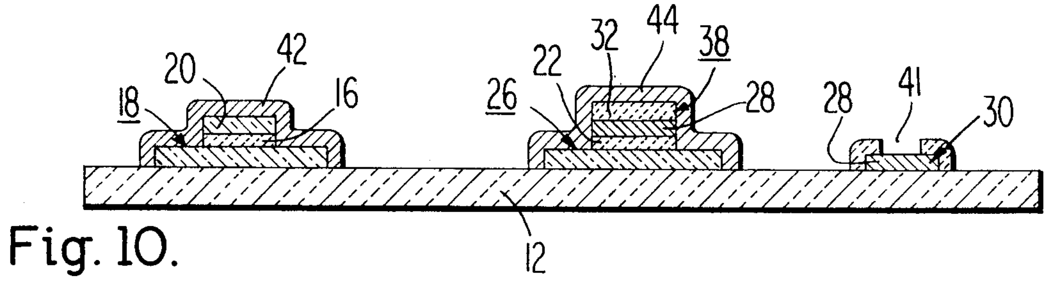

In a next series of steps, only the results of which are shown, in FIG. 10, the workpiece is coated with a 1,500 A. thick layer 42 of silicon dioxide having a high concentration, e.g., in the order of $1\times10^{20}$ atoms/cc., of P type conductivity impurities, e.g., boron atoms, and the layer 42 is defined to leave a portion thereof covering the island 18. Also, the workpiece is covered with a 1,500 A. thick layer 44 of silicon dioxide having a high concentration, e.g., in the order of $1\times10^{20}$ atoms/cc. of N type conductivity impurities, e.g., phosphorus, and this layer 44 is defined to leave a portion thereof overlying the island 26. Known deposition and photolithographic techniques can be used to perform these steps.

The layers 42 and 44 comprise solid-to-solid dopant sources for various parts of the field effect transistors to be fabricated of the islands 18 and 26.

Figure 11:
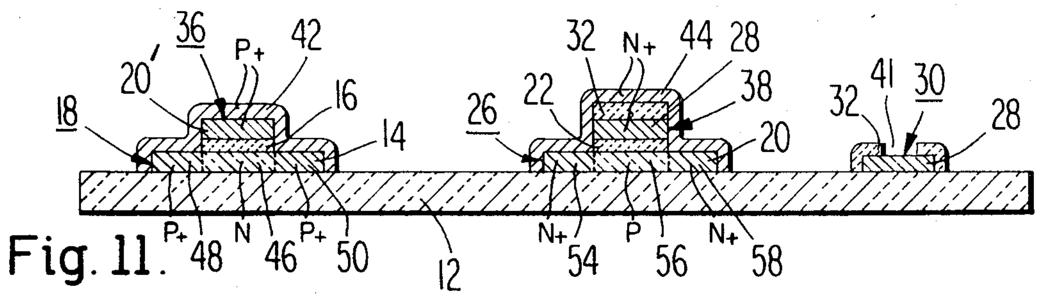

In the next step, the workpiece is heated in an inert atmosphere, e.g., argon, at 1,100° C., to drive the impurities within the layers 42 and 44 into various ones of the materials covered thereby. The result of this step is shown in FIG. 11.

Owing to the P type impurities in the layer 42 covering the island 18, the layer 20 of pedestal 36, originally of relatively low conductivity P type material, is converted to a relatively high ($P^+$) conductivity, e.g., having a resistivity of about 0.01 ohm-cm., this layer being referred to hereinafter using the reference numeral 20'. Diffusion of the P type impurities into the portion 46 of the N type layer 14 of the island 18 underlying the pedestal 36 is largely prevented by the presence of the silicon dioxide layer 16 which, as known, is effective as a diffusion barrier.

The diffusion of the P type impurities from the layer 42 into the layer 14 of island 18 on either side of the pedestal 36 provides two regions 48 and 50 of P type conductivity of, e.g., about .01 ohm-cm.

The resulting structure, comprising two P type regions 48 and 50 on opposite sides of an N type region 46, a silicon dioxide layer 16 covering the surface of the region 46, and a highly doped layer 20' of low electrical resistivity overlying the region 46, comprises a field effect transistor of the P-MOS type, i.e., a device having $P^+$ conductivity source 48 and drain 50 regions separated by an N conductivity channel region 46, a gate electrode 20' of $P^+$ conductivity, and an oxide layer 16 disposed between the gate electrode 20' and a channel region 46.

Likewise, the diffusion of N type impurities from the layer 44 covering the island 26 results in the formation of an N-MOS device, i.e., a device having an $N^+$ conductivity source region 54, a P conductivity channel region 56, an $N^+$ conductivity drain region 58, and a gate electrode 28 of $N^+$ conductivity. Since the gate electrode layer 28 was of high conductivity material when the layer 28 was originally formed, diffusion of impurities from the doping layer portion 44 into the layer 28 is not required. This explains why the oxide masking layer 32 had been left in place on the island 26.

The fact that the gate layer 28 from which one gate electrode and the island 30 are formed is highly doped when initially deposited has special significance. For example, in the prior art technique described above, the layers from which the gate electrodes and connector islands are formed comprise undoped silicon, when initially deposited, and are thereafter simultaneously doped by solid-to-solid diffusion techniques from layers of highly doped silicon dioxide disposed over the silicon gate electrodes. The thermally grown insulating layers are thereafter provided over the connector islands. A disadvantage of this process, we have found, is that the high temperature used in the thermal oxide growth process tends to cause additional significant diffusion of the conductivity defining impurity atoms present in the previously formed source and drain regions of the transistors. That is, the conductivity defining impurities in these regions are caused to diffuse laterally into the channel regions between the source and drain regions, thus reducing the width of the channel regions and cauisng an overlap of the gate electrodes with the source and drain regions. Such overlap, as known, is undesirable as reducing the device efficiency at high frequencies.

The instant invention avoids this problem by virtue of the fact that the connector islands 30 are of low resistivity when initially formed and no additional doping thereof is necessary during, as in the prior art process, the doping of the source and drain regions. Thus, the thermally grown oxide layer 32 can be provided prior to the formation of the source and drain regions and at a time when the high temperatures involved cause no ill effects.

A further advantage of the instant invention is that, with presently known techniques, the only way to provide N type impurities using a solid diffusion source layer is to dope the diffusion source layer with phosphorous. Phosphorus, however, has a very high diffusion speed. A problem, using phosphorus, we have discovered, is that owing to its high speed of diffusion, it can pass through the gate electrode layer in which doping is desired and into and through the underlying oxide layer. This is undesirable since it causes unwanted doping of the underlying layers.

In accordance with the instant invention, the gate electrode layer 28, desired to be of $N^+$ doping, is epitaxially deposited with the desired conductivity characteristic using arsenic as the doping impurity. Arsenic has a slow diffusion speed, whereby the problem of causing unwanted doping of the layers underlying the layer 28 during subsequent processing steps is avoided.

Boron, which can be used as the P type impurity of a solid-to-solid diffusion source layer, e.g., the layer 42 covering the island 18, has a slow diffusion speed, whereby the doping of the layer 20 using the layer 42 does not cause unwanted doping of the underlying layers.

To complete the device, the doping source layers 42 and 44 are removed, as by etching with buffered hydrofluoric acid, and an insulating material layer 60 (FIG. 12), e.g., deposited silicon dioxide, having a thickness of 1,000 A., is provided on the exposed silicon portions of the islands 18 and 26.

Figure 12:
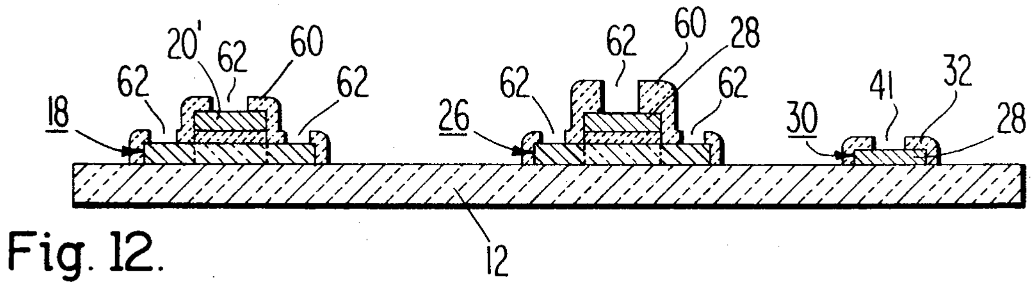
Figure 13:
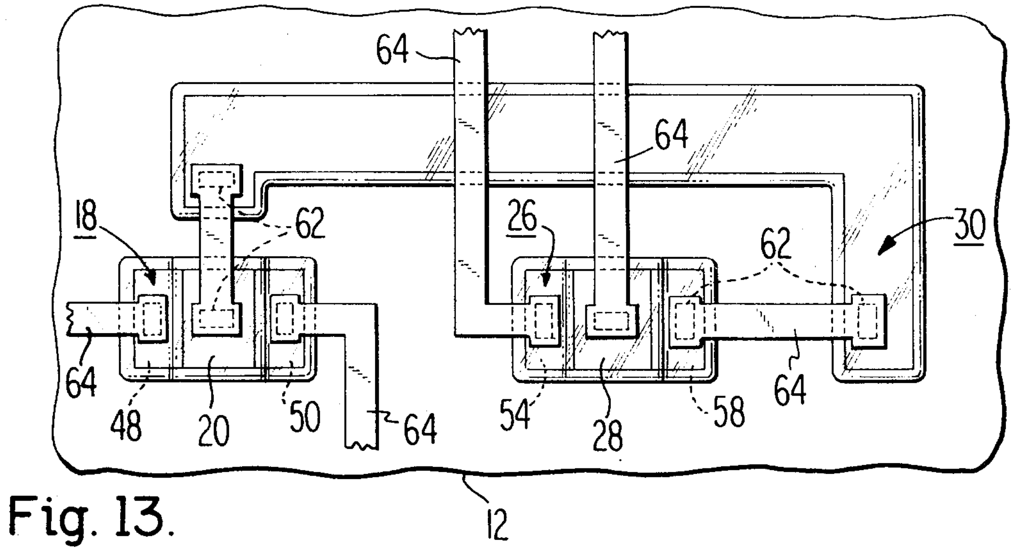
FIG. 13 is a plan view of the workpiece at still a later step in the processing thereof.

Thereafter, various openings 62 are made through the oxide layers 60 exposing, as shown in FIG. 12, surface portions of the various source and drain regions of the transistors of the islands 18 and 26, and surface portions of each gate electrode 20′ and 28. A layer of metal, e.g., aluminum, having a thickness of 1 micron, is next deposited onto the workpiece and into contact with the various exposed surface portions, and the metal layer is then defined, as by known means, to provide electrical connections 64 (FIG. 13) for the device. As shown, the elongated island 30 is used as a circuit connector between various components on the substrate 12, e.g., between the drain region 58 of the transistor of the island 26 and the gate electrode 20′ of the transistor of the island 18. The thick insulating layer 32 (FIG. 12) covering the conductive layer 28 of the island 30 allows crossing of other connectors 64 over the island 30 without causing shorting together of the connectors.

A modification of the above-described first process is now described.

Figure 2:
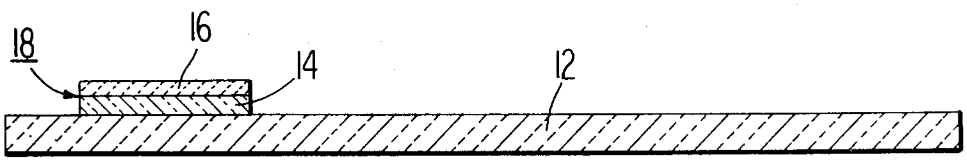

The modified process begin as the first process and proceeds to the condition of the workpiece as shown in FIG. 2, the workpiece comprising the substrate 12 having an island 18 of N conductivity thereon covered with a masking layer 16 of, e.g., silicon dioxide. However, whereas the masking layer 16 formed in the first process comprises the gate insulating layer of the transistor to be formed of the island 18 and, as described above, is thus preferably a thermally grown oxide, the masking layer 16 in the modified process is subsequently removed, as described hereinafter, and preferably comprises a deposited oxide layer. It is found that the use of silicon dioxide deposition processes, which are low temperature processes in comparison with silicon dioxide growth processes, are preferable with respect to the effect thereof on the electrical characteristics of the finished device. That is, it is found that the electrical properties of silicon films deposited in direct contact with sapphire substrates are more uniform and reproducible from device to device if the substrate has not been heated to high temperatures in an oxidizing atmosphere prior to the deposition of the silicon films.

Figure 4:
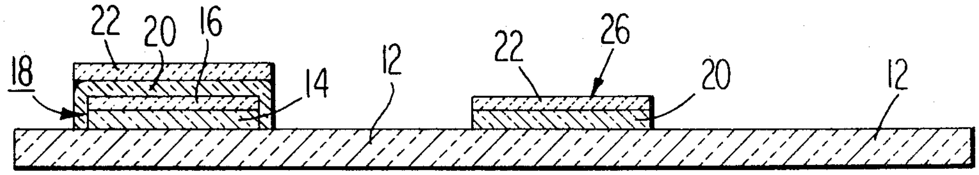
Figure 14:
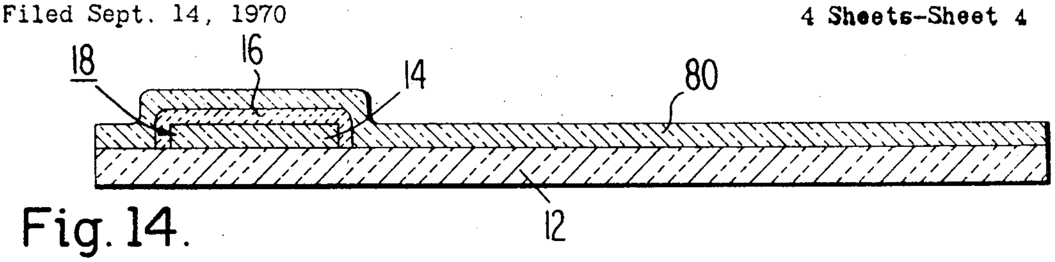
FIGS. 14–19 are cross sectional views of a workpiece processed according to a different embodiment of the invention and showing successive steps in the processing schedule.
Figure 15:
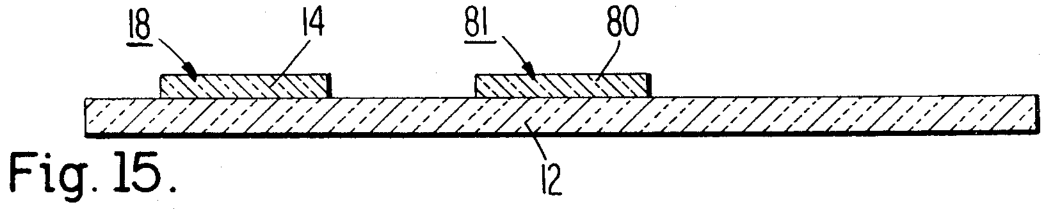

Thereafter, a layer 80 (FIG. 14) of 1 ohm-cm. P type silicon having a thickness of 1 micron is deposited on the workpiece, and this layer 80 is defined to provide a second island 81, as shown in FIG. 15. As shown in FIG. 15, both layers 16 and 80 (FIG. 14) covering the island 18 are removed. This is done, in comparison with the first process wherein, as shown in FIG. 4, the oxide layer 20 and the P type conductivity layer 16 are left in place on the island 18, because, in the instant process, the oxide layer 16 is not a thermally grown oxide, as above noted, and therefore is preferably eventually replaced with a thermally grown oxide.

Figure 16:
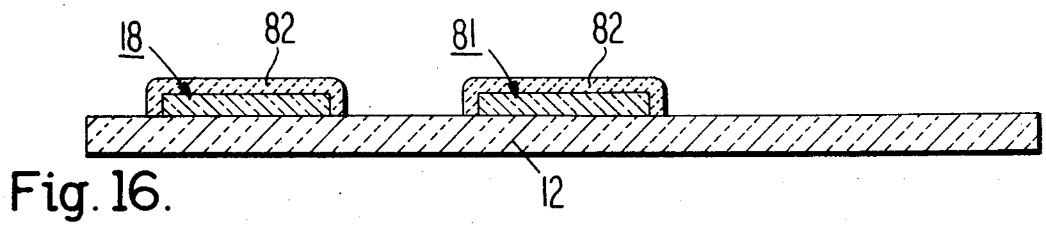

Such a thermally grown oxide layer 82 (FIG. 16) is next provided on each of the islands 18 and 81, the layers 82 having a thickness of 1,000 A. Since the islands 18 and 81 from which transistor components are to be formed have now already been provided on the substrate 12, the high temperature used to provide the layers 82 have little ill effect on the device reproducibility.

In another process, not illustrated, the two islands 18 and 81 can be provided by depositing a single layer of, say, P conductivity silicon on the substrate, defining the layer to form P conductivity islands, and, using known doping and masking techniques, doping one of the islands to the desired conductivity characteristics.

Figure 17:
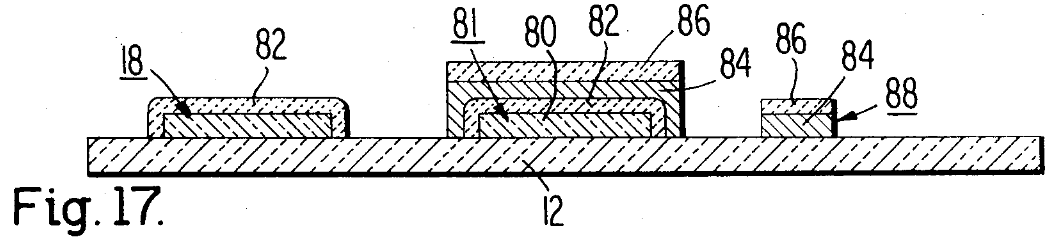

Thereafter, proceeding in the modified process, a layer 84 (FIG. 17) of highly doped silicon of arsenic doped N conductivity, e.g., having a conductivity of .001 ohm-cm. and a thickness of 1 micron, is deposited onto the workpiece, a layer 86 of silicon dioxide having a thickness of 3,000 A. is provided on the doped layer 84, and, using known photolithographic techniques, the two layers 84 and 86 are defined to provide the structure shown in FIG. 17. That is, the island 81 now has a covering layer 84 of N type conductivity silicon, covered, in turn, by a layer 86 of silicon dioxide. Also, a third island 88 is formed, the island 88 comprising a layer 84 of N conductivity silicon covered by a layer 86 of silicon dioxide.

Figure 18:
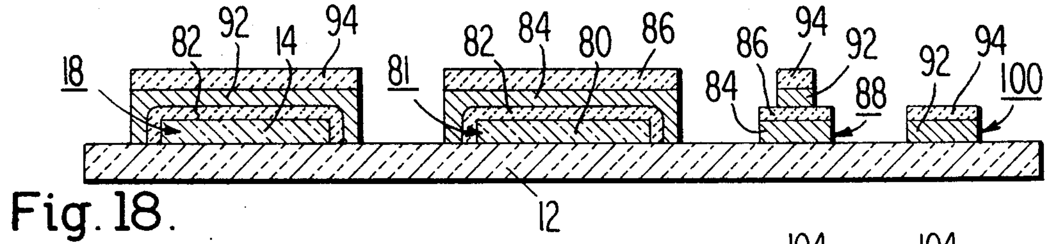

Thereafter, the last described sequence of steps is repeated, this time using a deposited layer 92 (FIG. 18) of boron doped P conductivity silicon, having a conductivity of .005 ohm-cm. and a thickness of 1 micron, the layer 92 being covered with a deposited layer 94 of silicon dioxide having a thickness of 5,000 A. These two layers are then defined to provide the structure shown in FIG. 18. That is, the island 18 is now covered with a P conductivity layer 92 covered, in turn, with an oxide layer 94. Also a portion of the island 88 is likewise covered with a P conductivity silicon layer 92 covered, in turn, by the oxide layer 94. Additionally, a new island 100, comprising the layer 92 of P conductivity silicon covered by the layer 94 of silicon dioxide, is formed on the substrate.

Figure 19:
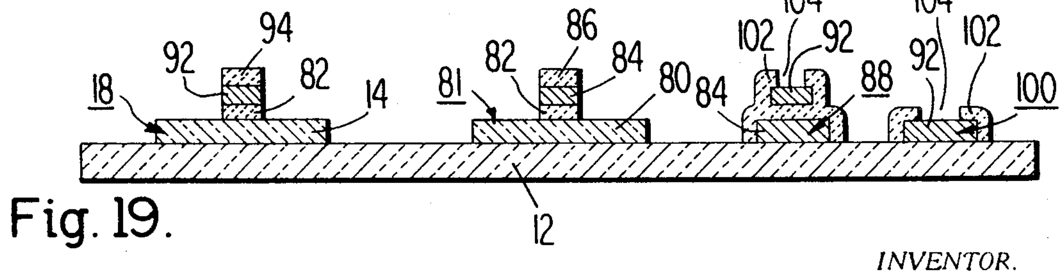

In a next series of steps, only the results of which are shown, in FIG. 19, the workpiece is exposed to a silicon dioxide thermal growth process to densify the deposited oxides 86 and 94 and to cover the sides of the silicon layers 84 and 92 of the islands 88 and 100 with a thermally grown layer 102 of silicon dioxide. The layers 82, 92, and 94 of the island 18, and the layers 82, 84, and 86 of the island 81 are then defined, as shown in FIG. 19, to provide gate electrodes 92 and 84 and channel oxide layers 82 of the transistors to be formed of the islands 18 and 81. During this last definition step, it is convenient to provide contact hole openings 104 exposing the layers 92 of the islands 88 and 100. Also, while not shown in FIG. 19, a further contact hole is made exposing the layer 84 of the island 88.

As in the first process, the provision, in the modified process, of the insulating layers 102 covering the connector islands 80 and 100 is done prior to the formation of the source and drain regions of the various transistors to be formed of the islands 18 and 81, thereby avoiding lateral diffusion of the impurities used to provide these regions.

Figure 9:
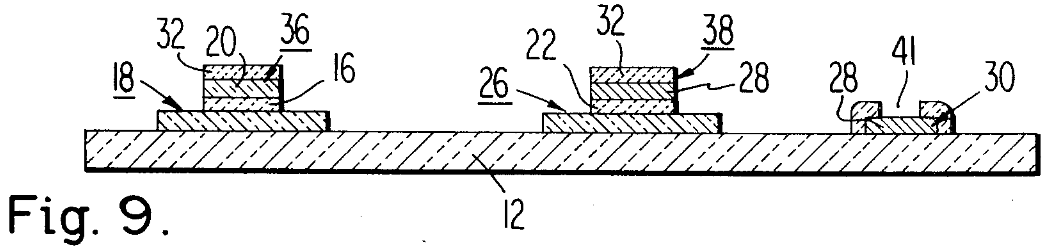

The workpiece shown in FIG. 19 is now at a step in the processing schedule similar to the processing step of the workpiece of the first process as shown in FIG. 9, and the subsequent processes used to complete the workpiece of the first process can be used to complete the instant workpiece. That is, separate doping source layers are provided on each of the islands 18 and 81, and the impurities contained in these layers are driven into the islands to form the source and drain regions of the transistors. Doping of the gate electrodes 92 and 84 of the transistors of the islands 18 and 81, respectively, is not necessary since these layers were of the desired conductivity characteristics as originally deposited. This avoids the problem involving the use of phosphorus as a doping impurity, as above described. The doping source layers are removed, protective oxide layers are provided on each of the islands 18 and 81, openings are made through the various oxide layers of the islands 18 and 81 to expose conductive portions thereof, and a layer of metal is deposited onto the workpiece and defined to provide the desired connections to the various device components.

The island 88 comprises two isolated connectors, one comprising the conductive layer 84, and the other comprising the conductive layer 92. Separate openings, as above described, are provided to expose each layer 84 and 92, whereby separate electrical connections can be made to each of the layers 84 and 92.

While the invention has been described using a substrate of insulating material, the substrate can comprise a semiconductor material, e.g., silicon, germanium, or the like. Using a semiconductor material substrate, instead of forming raised deposited islands on a surface of the substrate, as described above, island regions of different conductivity characteristics are provided as diffused regions imbedded within the semiconductor substrate adjacent to a surface of the substrate. These regions are then processed, in accordance with the instant invention, as the various islands 18, 26, and 81 of the above-illustrated embodiments of the invention, to obtain the desired results. Preferably, however, the various connector islands, such as the islands 30, 88, and 100 of the above-illustrated embodiments, are formed on the surface of the semiconductor substrate and, in order to obtain electrical isolation of the connector islands from the substrate, an insulating layer, such as silicon dioxide, is provided on the semiconductor substrate surface underlying the connector islands.

What is claimed is:

1. A method of fabricating an integrated circuit including field-effect transistors and connectors therefor, said method comprising:

forming a plurality of first areas and a plurality of second areas of doped semiconductor material on a substrate, providing a first layer of a dielectric material on a portion of each of said first areas, providing a second layer of doped semiconductor material on each of said first layers, said first and second layers leaving exposed certain surface portions of said first areas, thermally growing an insulating layer on portions of various ones of said second areas, thereafter providing a third layer of a material containing conductivity defining impurities on said certain surface portions of said first areas, driving the impurities in said third layer into said certain surface portions to form source and drain regions of transistors to be formed in said first areas, providing source, drain, and gate electrodes on said first areas to provide field-effect transistors therein, and providing electrical connectors on said substrate for interconnecting various ones of said transistors, various ones of said connectors crossing over various ones of said second areas at the insulated portions thereof and in electrical insulated relation therewith.

2. A method as in claim 1 wherein said second areas are formed of highly doped semiconductor material.

3. A method as in claim 1 including the steps of:

forming a plurality of third areas of doped semiconductor material on said substrate, providing a fourth layer of a dielectric material on a portion of each of said third areas, providing a fifth layer of doped semiconductor material on each of said third layers, said fifth layer having a type of conductivity opposite to that of said second layer, said fourth and fifth layers exposing certain surface portions of said third areas, subsequent to said step of thermally growing an insulating layer on said second areas, providing a sixth layer on said certain surface portions of said third areas, said sixth layer containing impurities providing a type of conductivity opposite to that provided by the impurities of said third layer, driving the impurities in said sixth layer into said certain portions covered thereby simultaneously with said step of driving the impurities from said third layer to form source and drain regions of transistors to be formed in said third areas, and providing source, drain, and gate electrodes on said third areas to provide field-effect transistor therein.

4. A method of fabricating an integrated circuit including field-effect transistors and connectors therefor, said method comprising:

forming a plurality of first areas, a plurality of second areas, and a plurality of third areas of doped semiconductor material on a substrate, said first second areas being of opposite conductivity type, providing a first layer of a dielectric material on a portion of each of said first and second areas, providing a second layer of doped semiconductor material on the first layers of said first areas, providing a third layer of doped semiconductor material on said first layers of said second areas, defining said first and second layers of said first areas and said first and third layers of said second areas to provide pedestals leaving exposed certain surface portions of said first and second areas on two sides of said pedestals, thermally growing an insulating layer on various ones of said third areas and on said third layers of said second areas, providing a fourth layer of a material containing conductivity defining impurities of one type covering said first areas and the pedestals thereon, and providing a fifth layer of a material containing conductivity defining impurities of the opposite type on said second areas including the pedestals thereon, driving the impurities in said fourth and fifth layers into portions of the areas covered thereby to form source and drain regions of transistors to be formed in said first and second areas and for modifying the conductivity of said second layer in the pedestals of said first areas, said insulating layer on said third layer preventing doping thereof by the impurities in said fifth layer, providing source, drain, and gate electrodes on said first and second areas to form field-effect transistors therein, and providing electrical connectors on said substrate for interconnecting various ones of said transistors, various ones of said connectors crossing over various ones of said third areas at the insulated portions thereof and in electrical insulating relation therewith.

5. A method as in claim 4 wherein said third layer, as provided, is highly doped with arsenic, and said fifth layer contains phosphorus as said conductivity defining impurity.

References Cited

UNITED STATES PATENTS

| | | | |
|---|---|---|---|
| 3,287,187 | 11/1966 | Rosenheinrich | 148—187 |
| 3,496,037 | 2/1970 | Jackson, Jr. et al. | 148—175 |
| 3,461,003 | 8/1969 | Jackson, Jr. | 148—175 |
| 3,614,661 | 10/1971 | Borner et al. | 148—187 X |
| 3,636,418 | 1/1972 | Burns et al. | 317—234 R |
| 3,412,460 | 11/1968 | Lin | 148—187 X |
| 3,447,238 | 6/1969 | Heynes et al. | 29—590 |
| 3,484,662 | 12/1969 | Hagon | 317—235 |
| 3,575,742 | 4/1971 | Gilbert | 148—188 |

FOREIGN PATENTS

| | | | |
|---|---|---|---|
| 1,160,744 | 8/1969 | Great Britain | 317—235/22 |
| 1,173,911 | 12/1969 | Great Britain | 317—235/22 |

(Other references on following page)

OTHER REFERENCES

Allison, et al.: "Thin Film Silicon—etc.," Proc. IEEE, vol. 57, No. 9, September 1969, pp. 1490–1498.

Allison et al.: "Silicon-on-Sapphire Complementary MOS Memory Cells," IEEE J.S.S.C. vol. SC–2, No. 4, December 1967, pp. 208–212.

L. DEWAYNE RUTLEDGE, Primary Examiner

JOHN M. DAVIS, Assistant Examiner

U.S. Cl. X.R.

148—174; 317—235 R